United States Patent
Maezawa

3,941,454
Mar. 2, 1976

[54] DISPLAY DEVICE WITH ORIENTED LIQUID CRYSTALS

[75] Inventor: Shuji Maezawa, Suwa, Japan

[73] Assignee: Kabushiki Kaisha Suwa Seikosha, Tokyo, Japan

[22] Filed: Aug. 10, 1973

[21] Appl. No.: 387,430

[30] Foreign Application Priority Data
Aug. 16, 1972 Japan.............................. 47-81440

[52] U.S. Cl........................... 350/160 LC; 350/150
[51] Int. Cl.².......................................... G02F 1/13
[58] Field of Search..................... 350/160 LC, 150

[56] References Cited
UNITED STATES PATENTS
3,731,986  5/1973  Fergason............................. 350/150

OTHER PUBLICATIONS
"Voltage–Dependent Optical Activity of a Twisted Nematic Liquid Crystal," by Schadt et al., Appl. Phys. Ltrs., Vol. 18, No. 4, pp. 127–128, 2/15/71.

*Primary Examiner*—Edward S. Bauer
*Attorney, Agent, or Firm*—Blum Moscovitz Friedman & Kaplan

[57] ABSTRACT

In a display device using liquid crystals, including opposed transparent insulating plates which define the volume containing said liquid crystals, the inner surfaces of said transparent plates are oriented as the result of unidirectional rubbing, the direction of rubbing on the opposed plates being at 90° to each other. A device using such plates has a preferred direction for viewing same.

3 Claims, 6 Drawing Figures

DISPLAY DEVICE WITH ORIENTED LIQUID CRYSTALS

BACKGROUND OF THE INVENTION

Liquid crystals have been used in a variety of display devices, particularly that type of liquid crystal known as nematic. This type of liquid crystal when in the mesomorphic phase is normally transparent. However, when a voltage is impressed across the liquid crystal material, where the liquid crystal is of the type that has a dipole moment which is transverse to the main axis of the liquid crystal molecule, then the liquid crystal material becomes light-dispersive, as a result of which it loses its transparency. By proper selection of portions of a display panel including liquid crystal materials of this type, it then becomes possible to make a display which becomes visible as a result of dispersion of ambient light.

Such displays using the more common type of nematic crystal are equally visible from all directions. Moreover, in general, they have optical activity so that the direction of plane-polarized light can be rotated. As is usual, the degree of rotation produced by a display device containing an optically active compound depends on the specific rotation of the compound itself and the quantity of compound traversed by the light beam in question.

Given a specific device, the rotation of the device will be fixed, depending on the construction, i.e., the specific rotation of the compound used and the concentration of the material and the length of the light path through the device. There is no way of affecting or varying the degree of rotation with such a device. However, it would be desirable to be able to do so.

SUMMARY OF THE INVENTION

Nematic liquid crystals are placed between two transparent plates having transparent electrodes on the inner surfaces thereof. The plates have each been unidirectionally rubbed. In bringing the plates together, they are oriented so that the direction of rubbing is different for the two plates. Using liquid crystals of positive dielectric anisotropy, the molecules immediately adjacent each surface tend to orient themselves in the same direction as the direction of rubbing. The molecules at intermediate points orient themselves to a degree which is a function of the distance from the two plates. As a result, a continuous spiral is formed between the two plates. This spiral has the property of rotating the plane of polarized light falling thereon. Further, if a voltage is impressed across the liquid crystal material the material loses its optical activity but does not become opaque or light-dispersive. Consequently, it can usefully be combined with a pair of polarizing plates. A method for preparing such devices is presented.

Accordingly, an object of the present invention is a display device utilizing liquid crystals whose optical activity can be controlled.

Another object of the present invention is a display device useful in combination with a timepiece.

A further object of the present invention is a display device using liquid crystals of positive dielectric anisotropy.

An important object of the present invention is a liquid crystal display device utilizing unidirectionally rubbed inner surfaces of transparent insulating plates for orienting liquid crystal molecules.

A significant object of the present invention is a method of preparing a liquid crystal display device whose optical activity with respect to rotating the plane of polarization of plane-polarized light can be controlled.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

In order to prepare a device in accordance with the present invention, advantage is taken of the fact that when a plate of a transparent insulating material such as glass is rubbed on the interior surface thereof in a single direction, and, when the plate is placed in contact with liquid crystal material of positive dielectric anisotropy, the liquid crystal molecules adjacent the plate align themselves with the rubbing direction of on the inner surface. Further, when two such plates are placed together so that the layer of liquid crystal molecules is confined between them, and where the rubbing directions on the inner surface is different for the two plates, then the orientation of the liquid crystal molecules between the plates changes continuously from the orientation of one surface to the orientation of the other surface. Accordingly, the nematic liquid crystal molecules are arranged along a helix having a central axis perpendicular to the plates.

Liquid crystals arranged in a spiral structure have optical activity. The direction of polarization of plane-polarized light passing therethrough changes in accordance with the rotation of the spiral structure. When the rubbing orientations on the inner surfaces of the two plates are perpendicular to each other, then the plane of polarization of linear polarized light passing therethrough is rotated by 90°.

Where the nematic liquid crystals used have a positive dielectric anisotropy, application of a voltage to transparent electrodes on the inner surfaces of the plates, assuming the voltage applied to be sufficient, causes the molecules to orient themselves perpendicular to the plates so that the spiral structure is extinguished. In consequence, the optical activity of the liquid crystal material is destroyed. The effect can be observed by placing on either side of the device described two polarizers having axes of polarization parallel to each other. That portion of the plates to which the voltage is applied will appear to be illuminated, and the remainder will be dark.

The degree to which liquid crystal molecules between the plates orient themselves in the direction of an applied electric field varies with the applied voltage. The voltage generally used is about 6 volts, preferably alternating current, and the saturation voltage is about 15 volts, also, alternating current. Where the voltage applied is only about 6 volts, complete orientation of the liquid crystal molecules distant from the charged plates is not obtained, and consequently, complete extinction of the optical activity of the material does not result. Under such conditions an unusual optical effect is observed, namely, the appearance of the device differs in accordance with the direction from which it is observed. In fact, there is generally a direction from which no optical inactivation appears to have occurred.

Figure 1A:
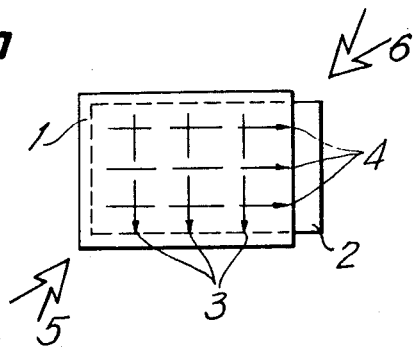
FIGS. 1a and 1b are a pair of unidirectionally rubbed plates in which the direction of rubbing is in line with and transverse to the direction of observation.
Figure 1B:
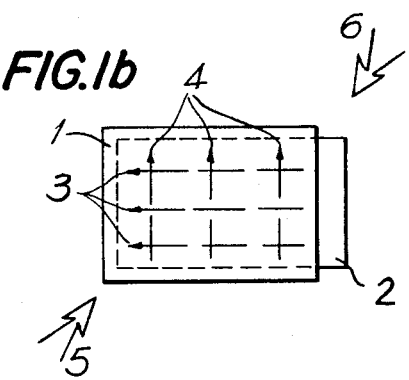

In the present invention two transparent plates having transparent electrodes on the inner surfaces thereof are identified respectively by the reference numerals 1 for the upper plate and 2 for the lower plate, in FIGS. 1a and 1b. The direction of orientation of the inner surface of the lower plate 2 is given the reference numeral 4 and for the upper plate 1 is given the reference numeral 3. When viewed from the direction indicated by the arrow having the reference numeral 5 there appears to be no optical inactivation. This is the case whether the spiral structure is dextrorotatory or or levorotatory. Conversely, in the direction indicated by the arrow 6 the optical inactivation effect appears very clearly.

As shown in FIGS. 1a and 1b, which is the conventional arrangement wherein the orientation of the inner surface is either in line with or transverse to the line of sight, the direction 5 where the optical inactivation effect does not appear is found to be that indicated by reference numeral 5. Again, the optical inactivation effect appears clearly in the direction indicated by the arrow 6. It should be noted, that another way of indicating the directions of orientation of the static charge or the orientation of the inner surfaces of the plates is with respect to whether the orientation is parallel to or perpendicular to the line connecting both eyes of the observer. This, of course, is the case with FIGS. 1a and 1b. So far as FIGS. 2a and 2b are concerned, the orientations of the inner surfaces are oblique to or, roughly at 45° to the line connecting the eyes of the observer.

Figure 2A:
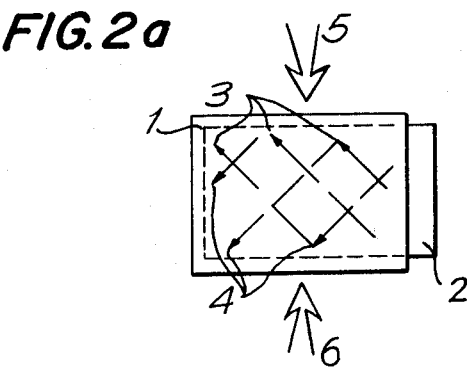
FIGS. 2a and 2b show embodiments of the present invention in which the direction of rubbing on the devices makes an angle of approximately 45° with a preferred direction of observation.
Figure 2B:
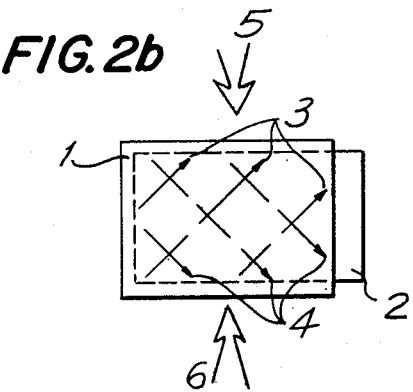
Figure 3:
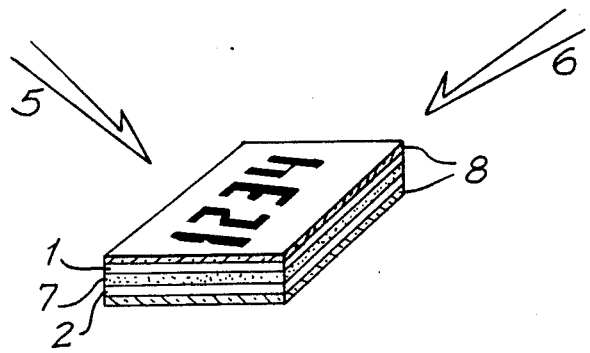
FIG. 3 is an embodiment of the present invention including a pair of unidirectionally rubbed plates as in FIGS. 2a and 2b in combination with a pair of polarizing plates.

FIG. 3 shows diagrammatically a set of plates oriented with respect to their inner surfaces as shown in FIGS. 2a and 2b. A layer of liquid crystals between plates 1 and 2 is indicated by the reference numeral 7. The device further comprises polarizing plates 8 on either side thereof. Again the indicia displayed by the device are readily seen from direction 6 but not from direction 5.

As will be seen from FIGS. 2a and 2b, the preferred viewing direction 6 makes an angle of about 45° with rubbing direction 3 on upper plate 1, and an angle of about 135° with rubbing direction 4 on lower plate 2. In FIG. 2a both of said angles as measured from the viewing direction 6 are traversed in the counterclockwise direction, whereas in FIG. 2b both of the corresponding angles correspond to clockwise traversal. It will be noted that the same holds for FIGS. 1a and 1b.

Figure 4:
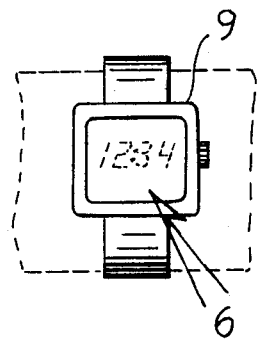
FIG. 4 is a timepiece incorporating a device in accordance with the present invention.

A device in accordance with the present invention is shown in FIG. 4 as part of a timepiece 9. As is customary with a right-handed person wearing the timepiece on his left hand, the timepiece would normally be viewed from the direction 6 as shown by the arrow. Where the plates 1 and 2 are charged obliquely to the line of sight as shown in FIG. 2a and FIG. 2b, the display panel effectively shows the indicia indicating the time.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A liquid crystal display device, comprising a cell including a nematic liquid crystal material of positive dielectric anisotropy sandwiched between upper and lower transparent plate members, opposed surfaces of which have electrode means thereon for forming characters, a vector from the bottom to the top of any character constituting a reference direction, each of the opposed surfaces of said plate members having been rubbed in a single direction on its inner surface, said single directions being at an angle of approximately 90° to one another said reference direction and said rubbing directions being so related that, regarding said reference direction and said rubbing directions as vectors, the angle from said reference direction to said rubbing direction on said upper plate is approximately 45° and to said rubbing direction on said lower plate is approximately 135°, the angles between said reference direction and each of said rubbing directions being in the same rotational direction, whether clockwise or counterclockwise, and means to apply a voltage across said cell which is less than the saturation voltage and which generates a character display, the visibility of which is angle-dependent.

2. The liquid crystal display device as defined in claim 1, wherein said device further comprises polarizer plates sandwiching said cell.

3. The liquid crystal display device as defined in claim 2 wherein said device is a portion of a timepiece.

* * * * *